United States Patent
de Léon

(10) Patent No.: US 9,015,640 B2
(45) Date of Patent: Apr. 21, 2015

(54) SYSTEM AND METHOD FOR PROVIDING DIRECT ACCESS TO AN APPLICATION WHEN UNLOCKING A CONSUMER ELECTRONIC DEVICE

(75) Inventor: David de Léon, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 826 days.

(21) Appl. No.: 13/205,129

(22) Filed: Aug. 8, 2011

(65) Prior Publication Data

US 2013/0042209 A1   Feb. 14, 2013
US 2013/0311955 A9   Nov. 21, 2013

Related U.S. Application Data

(63) Continuation of application No. PCT/IB2011/051108, filed on Mar. 16, 2011.

(51) Int. Cl.

| | |
|---|---|
| G06F 3/033 | (2013.01) |
| G06F 3/048 | (2013.01) |
| G06F 3/01 | (2006.01) |
| G06F 3/0488 | (2013.01) |
| G06F 1/16 | (2006.01) |

(52) U.S. Cl.
CPC ............ *G06F 3/017* (2013.01); *G06F 3/04883* (2013.01); *G06F 2200/1637* (2013.01); *G06F 1/1694* (2013.01)

(58) Field of Classification Search
CPC ... G06F 3/04883; G06F 3/0488; G06F 3/017; G06F 1/1694; G06F 2000/1637
USPC .......... 715/702, 716, 863, 864; 345/156, 169, 345/173
See application file for complete search history.

(56) References Cited

U.S. PATENT DOCUMENTS

| | | | | |
|---|---|---|---|---|
| 7,480,870 | B2 * | 1/2009 | Anzures et al. ............... | 715/772 |
| 7,487,467 | B1 * | 2/2009 | Kawahara et al. ........... | 715/810 |
| 7,593,000 | B1 * | 9/2009 | Chin ............................. | 345/156 |
| 7,978,176 | B2 * | 7/2011 | Forstall et al. ............... | 345/158 |
| 7,978,182 | B2 * | 7/2011 | Ording et al. ................ | 345/173 |
| 7,990,365 | B2 * | 8/2011 | Marvit et al. ................ | 345/156 |
| 8,127,254 | B2 * | 2/2012 | Lindberg et al. ............. | 715/863 |
| 8,195,220 | B2 * | 6/2012 | Kim et al. .................... | 455/550.1 |
| 8,245,143 | B2 * | 8/2012 | Yach et al. ................... | 715/744 |
| 8,271,907 | B2 * | 9/2012 | Kim et al. .................... | 715/863 |
| 8,279,184 | B2 * | 10/2012 | Lowles et al. ................ | 345/173 |
| 8,302,032 | B2 * | 10/2012 | Shin et al. .................... | 715/862 |
| 8,341,557 | B2 * | 12/2012 | Pisula et al. ................. | 715/863 |
| 8,363,008 | B2 * | 1/2013 | Ryu et al. ..................... | 345/156 |

(Continued)

FOREIGN PATENT DOCUMENTS

| | | | | |
|---|---|---|---|---|
| WO | | 0231788 A1 | 4/2002 | |
| WO | WO 2012123788 A1 * | | 9/2012 | ............... G06F 1/16 |

*Primary Examiner* — James T Durkin
(74) *Attorney, Agent, or Firm* — Coats & Bennett, PLLC

(57) ABSTRACT

A consumer electronic device has an orientation sensor and a lock control. The orientation sensor outputs signals identifying the orientation of the device, while the lock control to allow a user to move the device from a locked state to an unlocked state. The device also includes a plurality of application programs stored in memory. Responsive to the user unlocking the device, a controller will launch a selected application program. The application that is launched by the device is based on an orientation of the device.

13 Claims, 4 Drawing Sheets

(56) References Cited

U.S. PATENT DOCUMENTS

| | | | |
|---|---|---|---|
| 8,365,099 B2* | 1/2013 | Cho et al. | 715/863 |
| 8,547,466 B2* | 10/2013 | Chao | 348/333.01 |
| 8,634,876 B2* | 1/2014 | Friedman et al. | 455/566 |
| 8,745,490 B2* | 6/2014 | Kim | 715/702 |
| 2004/0085351 A1* | 5/2004 | Tokkonen | 345/741 |
| 2005/0060554 A1* | 3/2005 | O'Donoghue | 713/183 |
| 2005/0079896 A1* | 4/2005 | Kokko et al. | 455/566 |
| 2005/0210418 A1* | 9/2005 | Marvit et al. | 715/863 |
| 2005/0253817 A1* | 11/2005 | Rytivaara et al. | 345/173 |
| 2006/0161871 A1* | 7/2006 | Hotelling et al. | 715/863 |
| 2007/0004451 A1* | 1/2007 | Anderson | 455/556.1 |
| 2007/0150842 A1 | 6/2007 | Chaudhri et al. | |
| 2008/0136587 A1* | 6/2008 | Orr | 340/5.31 |
| 2008/0165144 A1* | 7/2008 | Forstall et al. | 345/173 |
| 2008/0165152 A1* | 7/2008 | Forstall et al. | 345/173 |
| 2008/0211778 A1* | 9/2008 | Ording et al. | 345/173 |
| 2009/0225026 A1* | 9/2009 | Sheba | 345/156 |
| 2009/0225040 A1* | 9/2009 | Whytock | 345/173 |
| 2009/0307631 A1* | 12/2009 | Kim et al. | 715/830 |
| 2010/0037184 A1 | 2/2010 | Sie | |
| 2010/0044121 A1* | 2/2010 | Simon et al. | 178/18.03 |
| 2010/0088639 A1* | 4/2010 | Yach et al. | 715/825 |
| 2010/0146384 A1* | 6/2010 | Peev et al. | 715/255 |
| 2010/0306693 A1* | 12/2010 | Brinda | 715/784 |
| 2011/0316797 A1* | 12/2011 | Johansson | 345/173 |

* cited by examiner

SYSTEM AND METHOD FOR PROVIDING DIRECT ACCESS TO AN APPLICATION WHEN UNLOCKING A CONSUMER ELECTRONIC DEVICE

RELATED APPLICATIONS

This application is a continuation application of International Patent Application number PCT/IB2011/051108 filed on Mar. 16, 2011, the entire contents of which are incorporated herein by reference in its entirety.

FIELD OF THE INVENTION

The present invention relates generally to consumer electronic devices, and particularly to consumer electronic devices capable of executing one or more application programs resident thereon.

BACKGROUND

Consumer electronic devices, such as cellular telephones and tablet computing devices, are commonplace. With these devices, users can communicate world wide with other users, access the Internet, and capture images and/or video to share with other users. Additionally, users can employ these devices to also read e-Books, play games, send and receive email, and tend to their respective social networking sites. The key to being able to perform these functions are the application programs that are resident on, and executed by, the devices.

Almost all of these devices are configured to automatically lock themselves after a predetermined time has elapsed with the device remaining idle. Unlocking the device typically requires the user to press a button or other control displayed on a touch-sensitive screen, or contained on the housing of the device. Sometimes, the user is prompted to enter a password or PIN; however this is not required. Once unlocked, the user is generally presented with a "desktop" or "home screen" having one or more graphic icons—each representing an application program. To launch or access a given application program, the user needs only to select the corresponding icon. However, the process of unlocking the device, finding a specific application, and then launching the application can be cumbersome and time-consuming, especially if the user's device has many different applications installed and/or launching the application is time critical.

SUMMARY

The present invention provides a device and method that utilizes orientation information indicating a current orientation of the device to automatically execute a predefined application program resident in the device's memory when the device is unlocked. In one embodiment, a method of launching application programs on a consumer electronic device comprises storing a plurality of application programs in a memory of the consumer electronics device, and executing an application program selected based on an orientation of the consumer electronics device responsive to the device transitioning from a locked state to an unlocked state.

In one embodiment, the method further comprises receiving an orientation signal from an orientation sensor associated with the consumer electronic device indicating the orientation of the consumer electronic device.

In one embodiment, the method further comprises receiving user input transitioning the consumer electronic device from the locked state to the unlocked state.

In one embodiment, receiving user input transitioning the consumer electronic device to the unlocked state comprises detecting that the user has actuated a lock control on the consumer electronic device.

In one embodiment, the method further comprises associating respective identifiers for one or more of the application programs to corresponding orientation indicators for the consumer electronic device, and storing the associations in memory of the consumer electronic device.

In one embodiment, executing the selected application program comprises placing the consumer electronic device into the unlocked state, determining the orientation of the device, comparing the orientation of the device to the orientation indicators stored in memory, and executing the application program corresponding to the orientation indicator that matches the determined orientation of the device.

In one embodiment, the method further comprises displaying a graphical indicator on a lock control displayed on the consumer electronic device to identify which selected application program would be executed responsive to transitioning the consumer electronic device to the unlocked state in a current orientation.

In one embodiment, the method further comprises changing the graphical indicator from a first graphical indicator identifying a first selected application program to a second graphical indicator identifying a second selected application program responsive to detecting a change in the orientation of the consumer electronic device.

In another embodiment, the present invention also provides a consumer electronics device comprising a memory configured to store a plurality of application programs to be executed by the consumer electronic device, and a programmable controller configured to execute an application program selected based on an orientation of the consumer electronic device when the device transitions from a locked state to an unlocked state.

In one embodiment, the device further comprises an orientation sensor configured to provide an orientation signal identifying the orientation of the device.

In one embodiment, the orientation sensor comprises an accelerometer.

In one embodiment, the device further comprises a lock control configured to output an unlock signal responsive to the user transitioning the consumer electronic device to the unlocked state.

In one embodiment, the device further comprises a touch-sensitive display, and wherein the lock control comprises a slide lock control displayed on the touch-sensitive display.

In one embodiment, the slide lock control includes a graphical indicator that identifies which selected application program would be executed responsive to the user transitioning the consumer electronic device to the unlocked state in the current orientation.

In one embodiment, the programmable controller is configured to change the graphical indicator from a first indicator to a second indicator responsive to detecting a change in the orientation of the consumer electronic device.

In one embodiment, the lock control comprises a control disposed on the housing of the consumer electronic device.

In one embodiment, the device further comprises a user interface, and wherein the programmable controller is configured to receive user input from the user interface transitioning the consumer electronic device to the unlocked state.

In one embodiment, the programmable controller is configured to associate respective identifiers for one or more of the application programs to corresponding orientation indicators for the consumer electronic device, and store the associations in the memory.

In one embodiment, the programmable controller is further configured to place the consumer electronic device into the unlocked state, determine the orientation of the device, compare the orientation of the device to the orientation indicators stored in memory, and execute the application program corresponding to the orientation indicator that matches the determined orientation of the device.

In another embodiment, the present invention provides a consumer electronic device comprising a memory configured to store a plurality of application programs to be executed by the consumer electronic device, a touch-sensitive slide-lock control configured to transition the consumer electronics device from a locked state to an unlocked state, an orientation sensor configured to output orientation signals indicating an orientation of the consumer electronic device, and a programmable controller configured to execute a selected application program in memory when the device transitions to the unlocked state based on the orientation signals.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a device that utilizes orientation information indicating the current orientation of the device to automatically launch a predefined application program resident in the device's memory. The device includes an orientation sensor, such as an accelerometer, for example, and a lock control. The orientation sensor generates different signals depending on the orientation of the device (e.g., vertically or horizontally oriented). The lock control, which may be a slide lock on a touch-sensitive display screen of the device, allows the user to unlock the device for use.

In one embodiment of the present invention, one or more of the applications programs stored in memory of the device are associated with unique, predefined orientations of the device. The device detects when the user unlocks the device and determines its current orientation. Based on the current orientation, the device launches the corresponding application program. The user is not required to navigate a conventional menu system or otherwise search for the program. Rather, the present invention executes the application program directly. Thus, based on the orientation of the device, the present invention configures the lock control to function as a "shortcut" to a user-specified application program in addition to its intended function of unlocking the device.

Figure 1:
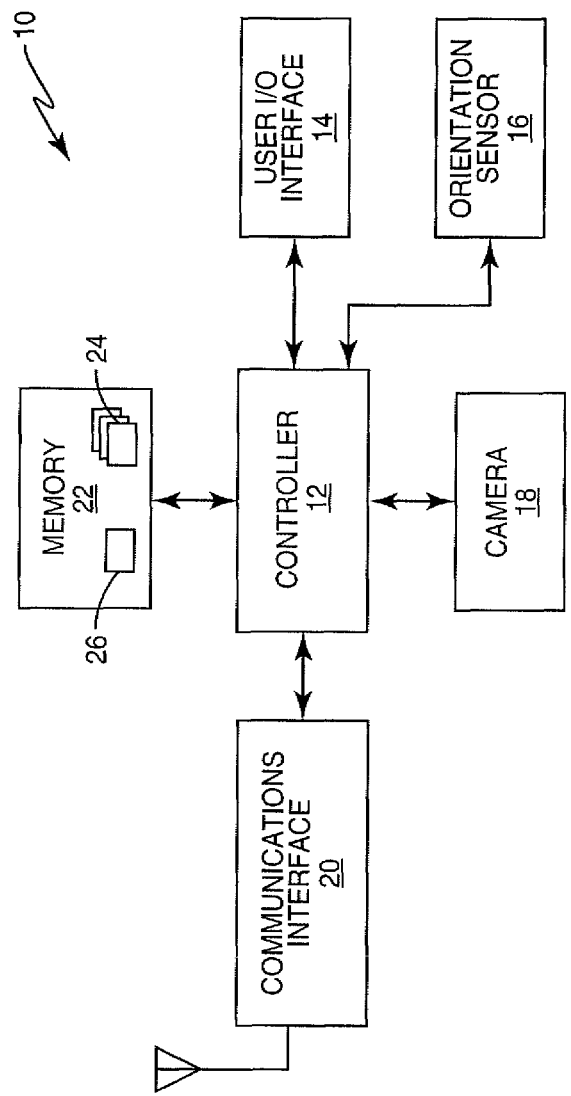
FIG. 1 is a block diagram illustrating some component parts of a consumer electronic device configured according to one embodiment of the present invention.

Turning now to the drawings, FIG. 1 is a block diagram illustrating the component parts of a consumer electronic device 10 configured according to one embodiment of the present invention. As seen in FIG. 1, device 10 comprises a controller 12, a user interface 14, an orientation sensor 16, an integrated camera circuit 18, a communication interface 20, and a memory 22. Stored in memory 22 are one or more application programs 24 that execute on device 10, and a database or other structure that maps the identities of one or more of the application programs 22 to a specific orientation of device 10.

Controller 12 may be, for example, one or more general purpose or special purpose microprocessors that control the operation and functions of device 10 in accordance with program instructions and data stored in memory 22. In one embodiment of the present invention, controller 12 is configured to determine its own current orientation. Controller 12 is also configured to detect when the user unlocks device 10. As described in more detail later, the controller 12 will automatically begin executing a specified application program when the user unlocks the device 10 based on the determined orientation. More specifically, the controller 12 is programmed to identify and execute the selected application program 24 directly without requiring the user to additionally actuate a shortcut icon or navigate a series of hierarchical menus.

The User Input/Output (I/O) Interface 14 enables a user to exchange information with device 10 and includes controls that facilitate such interaction. Typically, the user interface 14 includes a display, such as a Liquid Crystal Display (LCD) or touch-sensitive display, which allows the user to view information such as dialed digits, images, call status, menu options, and other service information. The user interface 14 will also generally include a keypad or other controls that allows the user to enter digits and other alpha-numeric input.

According to one embodiment of the present invention, the user interface 14 includes a lock control. As is known in the art, a user may manually place the device 10 in a "locked" state. Alternatively, device 10 may place itself in the locked state automatically after a predefined time in which it is idle. While in this "locked" state, the user is prevented from using device 10 for all but a very limited set of functions. To use device 10, the user must actuate the lock control to place the device 10 in an "unlocked" state. The lock control may be, for example, a touch-sensitive slide lock displayed on the touch-sensitive display, or a button or other control on the housing of device 10.

The orientation sensor 16 is typically integrated within the interior of device 10. Sensor 16 may comprise any sensor known in the art able to detect the orientation of the device 10, and provide an indication of that orientation to controller 12. The orientation sensor 16 may provide the orientation signals to the controller 12 periodically, or may only provide the signals to controller 12 responsive to an occurrence of some predetermined event. In some cases, the orientation sensor 16 provides the orientation signals in response to receiving a valid message requesting the orientation signals. Some examples of orientation sensors 16 that are suitable for use in device 10 include, but are not limited to, gyroscopes and accelerometers.

In one embodiment, the orientation sensor 16 comprises a low-power, ultra-compact, multi-axis, linear accelerometer that measures the acceleration of device 10 relative to an observer momentarily at rest relative to device 10. Generally, the accelerometer used in device 10 comprises a sensing element (not shown) and an Integrated Circuit (IC) interface (not shown). The sensing element senses an imbalance that occurs when the device 10 is tilted or moved off its nominal position (e.g., moved from a vertical orientation), while the IC interface provides the sensing element a means to communicate those signals with the programmable controller 12. Conventionally, accelerometers are utilized for presenting a displayed image in a portrait or landscape mode. For example, many "smartphones" and tablet computers utilize an accelerometer to switch between portrait and landscape modes depending upon which way the user holds the device. However, with the present invention, the orientation signals are additionally utilized to launch pre-defined application programs that are resident in memory of device 10. One type of sensor that is suitable for use, for example, is the LIS302DL MEMS motion sensor sold by STMICROELECTRONICS, although other accelerometers may be equally as suitable.

The camera 18 is a conventional camera that may or may not be integrated into the interior of the device 10. Because the use and structure of camera 18 is well-known in the art, it is only briefly described here. Particularly, camera 18 typically comprises an image sensor, an image processor, memory, and a controller, none of which are seen in the figures. A lens assembly, also not shown, will typically be used to focus ambient light entering the device 10 onto the image sensor. Values representing the image are then sent from the image sensor to the image processor and/or controller 12 for processing.

The communications interface 20 may be any communication interface known in the art, but generally allows the user of device 10 to send and receive messages and data to and from a remote device over an established communications link. In one embodiment, the communication interface 20 is a fully functional cellular radio transceiver for transmitting signals to and receiving signals from a base station or other access node in a wireless communications network. In another embodiment, communications interface 20 comprises a short-range communications interface that permits the user to communicate data and information over relatively short distances—usually tens of meters. Those skilled in the art will appreciate that the communications interface 20 may implement any one of a variety of communication standards including, but not limited to, the standards known as the Global System for Mobile Communications (GSM), General Packet Radio Service (GPRS), Universal Mobile Telecommunication System (UMTS), TIA/EIA-136, cdmaOne (IS-95B), cdma2000, 3GPP Long Term Evolution (LTE), and Wideband CDMA (W-CDMA), and BLUETOOTH.

Memory 22 represents the entire hierarchy of memory in device 10, and may include both random access memory (RAM) and read-only memory (ROM). Memory 22 stores the program instructions and data required for controlling the operation and functionality of device 10, as well as the plurality of application programs 24 that may be executed on device 10 by controller 12.

As is known in the art, the controller 12 will retrieve and execute a given application program 24 from memory 20 responsive to a user actuating a shortcut or selecting the application program 24 from a menu. According to one embodiment, the controller 12 is also configured to retrieve and execute a specific application program 24 when user transitions the device 10 from a "locked" state to an "unlocked" state via the user interface 14. Particularly, the user associates one or more of the application programs 24 to respective orientations of the device 10 and stores the association in memory. When the user unlocks the device 10, the programmable controller 12 determines the current orientation for the device and executes the application program 24 associated with that orientation.

Figure 2:
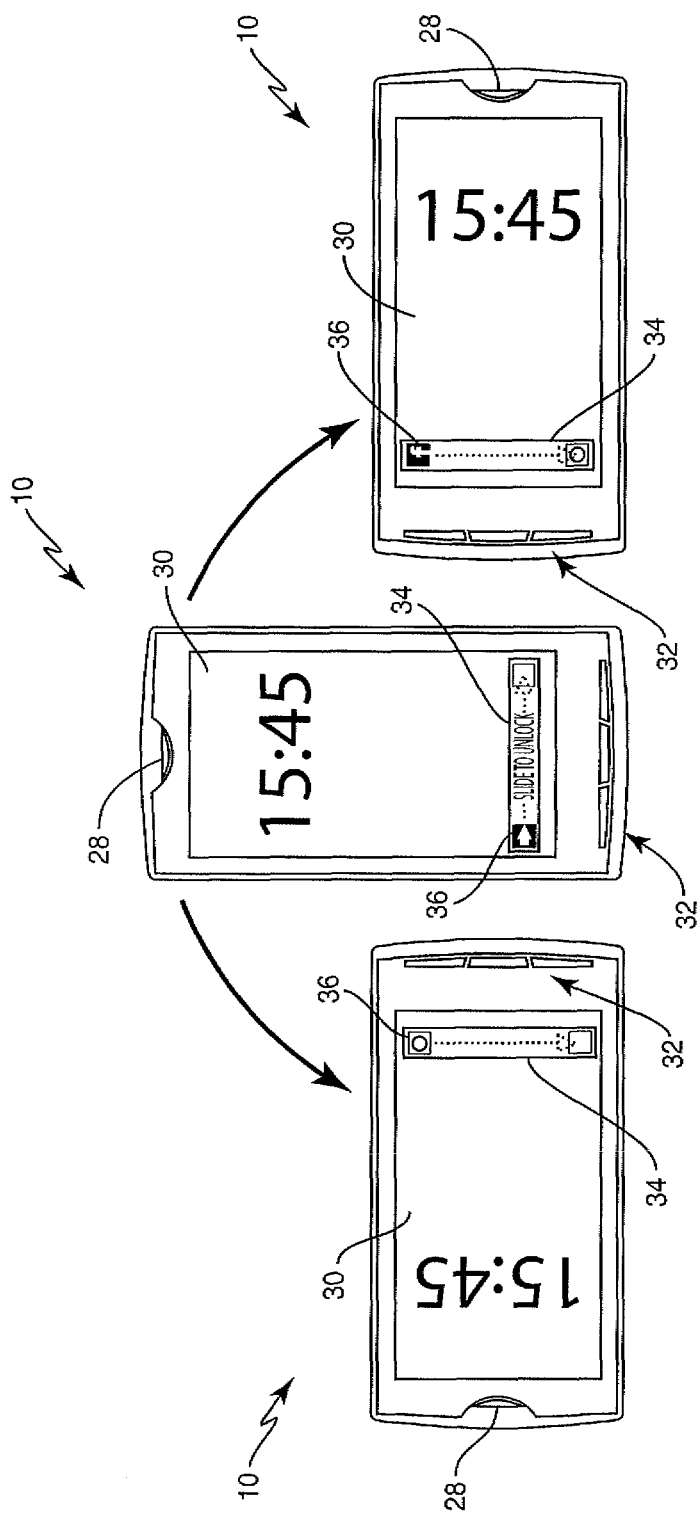
FIGS. 2A-2C are perspective views of a consumer electronic device configured according to one embodiment of the present invention in exemplary orientations.

FIGS. 2A-2C are perspective views graphically illustrating this embodiment of the present invention. In these figures, some of the user interface 14 components are seen. Particularly, the user interface of device 10 includes a speaker 28 to render audible sound to the user, a touch-sensitive display 30 to output information and date and to accept user input, and a set of global controls 32 that facilitate user interaction with device 10. Other user interface components such as a microphone, for example, may also be present on device 10, but are not discussed here in detail.

FIGS. 2A-2C illustrate device 10 as a "smartphone" in different orientations. Additionally, in each FIG. 2A-2C, device 10 is shown in a "locked" state. That is, the device 10 is in a state in which a user cannot access the functions of device 10. This includes the application programs 24 as well as the communication functions of device 10. To gain access to the programs 24 and functions, the user must first place the device 10 in an "unlocked" state. In the unlocked state, the user may freely access the application programs 24 and other functions of device 10.

To facilitate transitioning the device 10 into the unlocked state, the touch-sensitive display 30 includes a lock control, which in this embodiment, is a slide-lock control 34. Generally, the slide-lock control 34 is displayed whenever the device enters the locked state. To unlock device 10, the user simply touches and slides the virtual button control 36 in the direction of the arrow from one end of the slide control 34 to the other.

In conventional devices, actuating the slide-lock control 34 to unlock the device would simply place the user at a first of one or more "home screens" or "desktop" screens, each having a plurality of different graphical indicators or icons representing different application programs 24. To launch a desired program on these conventional devices, the user must first search for and locate the desired application program 24 on one of possibly many home screens after unlocking device 10. In many cases, the icons on the display 30 are not logically organized, which makes it difficult and cumbersome to locate oft-used programs. Once found, the user must actuate the desired application program by touching the associated graphical indicator.

The entire process of unlocking the device, finding a specific application program, and launching the application can be cumbersome and time-consuming, especially if the user's device has many different application programs installed and/or launching the application program is time critical. Therefore, the present invention provides a method that negates the need for the user to perform additional steps to launch an application program from a locked device.

Particularly, the present invention permits the user to map or associate different application programs 24 to corresponding different orientations of the device 10. That is, one application program 24 is associated with one orientation. The associations between the application programs 24 and the orientations of device 10 are then stored in memory 20 of device 10. Thereafter, whenever the user unlocks the device 10, the controller will launch whichever application is associated with that orientation. To assist the user in determining which application will launch for a give orientation of device 10, the controller 12 may place a graphical representation such as an icon identifying the application program 24 for that particular orientation on the slide button control 36.

For example, FIG. 2A is seen in a "vertical" orientation with an "arrow" displayed on the button control 36. In this orientation, when the user slides the button control 36 to the other side of the slide-lock control 34, the programmable controller 12 will cause the touch-sensitive display 30 to display the first of the home screens in the portrait mode. To access one of the application programs 24 once device 10 is unlocked, the user can search for and locate an icon for the program among the different screens.

FIG. 2B illustrates device 10 as having been rotated by the user approximately 90° to a first "horizontal" orientation. In this first orientation, the programmable controller 12 will directly launch the camera application resident in memory 20 when the user moves the button control 36. FIG. 2C, however, illustrates device 10 as having been rotated by the user approximately 90° in a second, opposite direction to a second "horizontal" orientation. In this second orientation, the programmable controller 12 is configured to directly launch the "FACEBOOK" application resident in memory 20 when the user slides the button control 36 in the direction of the arrow. By "directly" launching either the camera application or FACEBOOK application, depending on the orientation of the device 10, the present invention negates the cumbersome need for a user to search for and manually execute these application programs.

Figure 3:
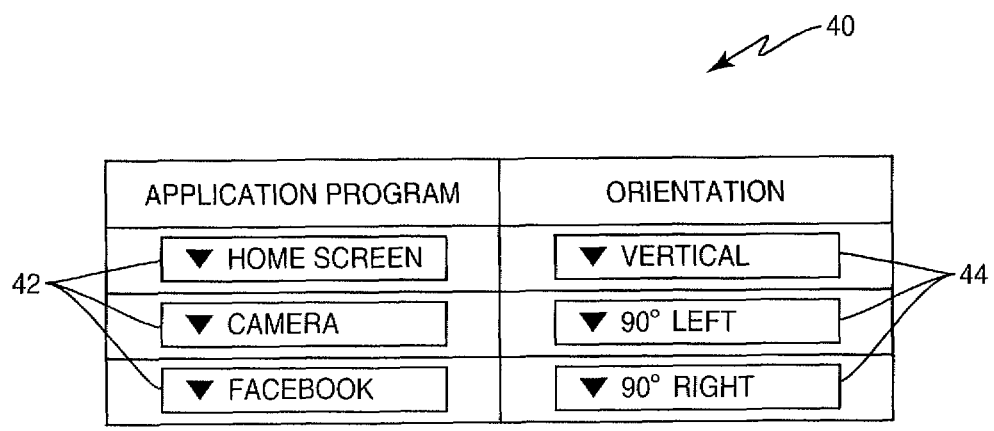
FIG. 3 is a perspective view illustrating a table used to associate the applications resident on a consumer electronic device with a predefined orientation of the device.

FIG. 3 illustrates how a user may associate different application programs 24 with corresponding orientations of device 10. As seen in FIG. 3, the device 10 stores a table 40 in memory 20. A first column of table 40 identifies a particular application program 24 while the second column details the particular orientation that the program 24 is associated with. Other information may also be stored in table 40 as needed or desired such as an application ID that the programmer 12 needs to launch the program.

Drop down lists may be used to facilitate interaction with the user; however, other means of data entry are also suitable with the present invention. As seen in the example of FIG. 3, the user has associated the "Home Screen" with the vertical orientation of device 10 (e.g., FIG. 2A). Additionally, the "Camera" and "FACEBOOK" applications 24 are associated with the "Left" and "Right" horizontal orientations, respectively (e.g., FIGS. 2B-2C). The user may, at any time, access this table and change the application program associations, the respective orientations, or both.

It should be noted that, although the user is able to define the orientation for the "Home Screen," the user may not be permitted to alter the orientation for the "Home Screen" in all embodiments. In some cases, the vertical orientation may be the default orientation for the "Home Screen," and not changeable by the user.

Figure 4:
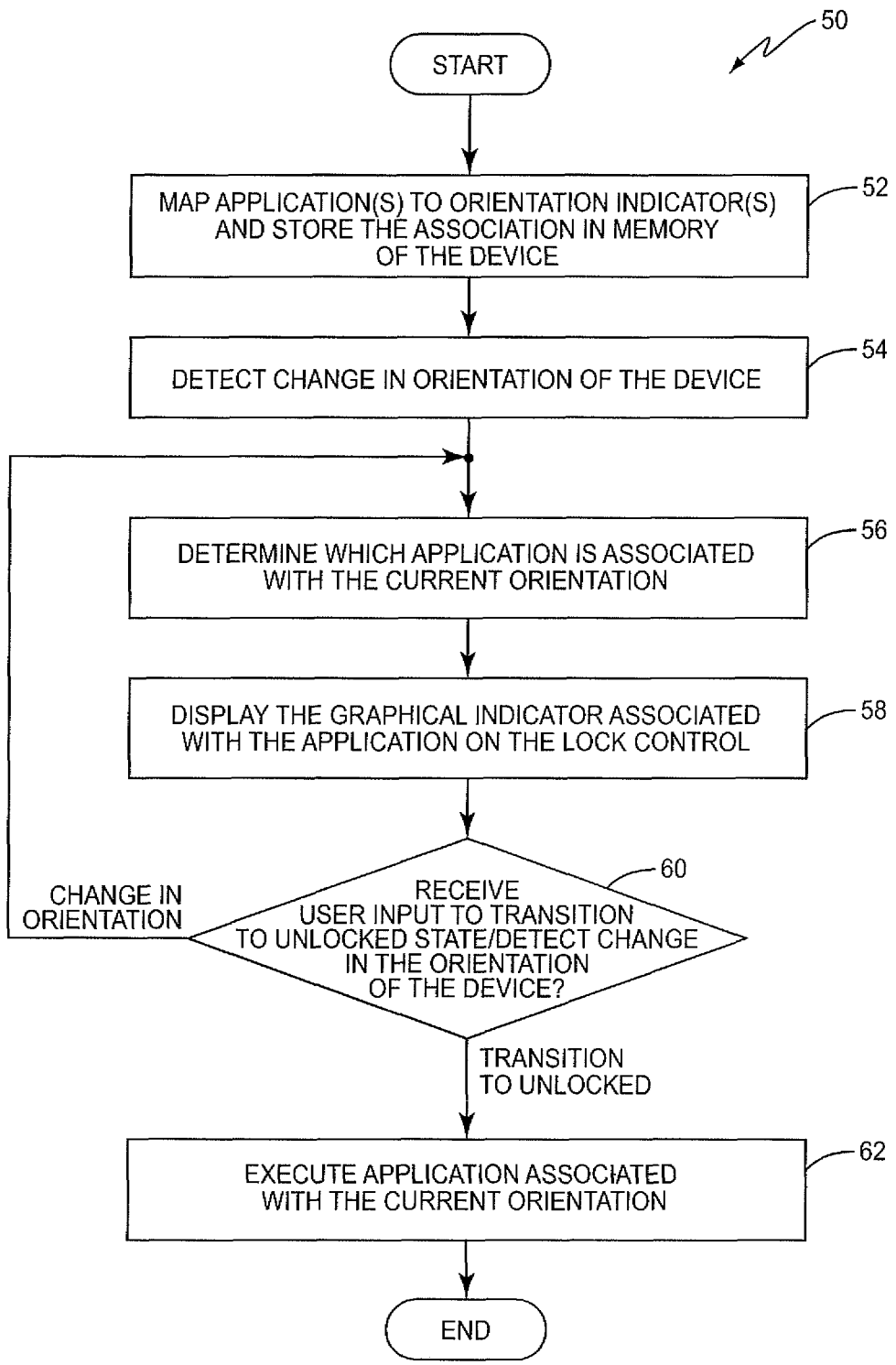
FIG. 4 is a flow diagram illustrating a method performed by a consumer electronic device configured according to one embodiment of the present invention.

FIG. 4 is a flow diagram illustrating a method 50 of how device 10 directly launches a selected application program 24 based on the orientation of device 10 according to one embodiment of the present invention. As seen in FIG. 4, method 50 begins with the user mapping one or more of the application programs 24 to corresponding orientation indicators, and storing the associations in memory 20 (box 52). As seen above, the user may accomplish this by managing the data and information in table 40. Once mapped, the programmable controller 12 waits to detect a change in the orientation of the device 10 (box 54).

By way of example, the orientation sensor 16 in device 10 may generate and output an orientation signal indicating the orientation of device 10. The manner by which orientation sensors detect and generate such orientation signals is well-known in the art, and therefore, not discussed in detail here. It is sufficient to state, however, that the orientation sensor 16 will generate and output one or more signals that indicate to the programmable controller 12 whether the device 10 is or is not vertically orientated, and if not, which of the horizontal orientations (i.e., 90° left or 90° right) device 10 currently occupies.

Once controller 12 has determined the orientation of device 10, the controller 12 determines which application program 24 is associated with the detected orientation (box 56). In one embodiment, for example, the programmable controller 12 will compare the orientation signals received from the orientation sensor 16 with the orientation information stored in table 40. Upon determining a match, controller 12 will alter the visual appearance of the slide-lock button control 34 to display an icon or other graphical indicator that identifies the application program 24 associated with the detected orientation of device 10 (box 58).

As previously stated, the programmable controller 12 will directly launch the application program 24 associated with the current orientation of device 10. Therefore, the programmable controller 12, assuming that device 10 is currently in a locked state, will wait for user input transitioning the device 10 to the unlocked state (box 60). Upon receiving such user input, the controller 12 will simply execute the application program 24 associated with the current orientation of device 10 directly without requiring the user to perform further navigation or browsing to search for the associated application program 24 (box 62). In the absence of such user input, the programmable controller 12 waits to detect a change in the orientation of device 10.

The present invention may, of course, be carried out in other ways than those specifically set forth herein without departing from essential characteristics of the invention. For example, the figures and corresponding specification identify the device 10 as being a cellular telephone, and more particularly, a "Smartphone." It should be noted, however, that this particular depiction for device 10 is for illustrative purposes only. The present invention is also suitable for use in other consumer electronic devices including, but not limited to, satellite telephones, Personal Digital Assistants (PDAs), and computing devices such as tablet computers.

Further, the specification and figures describe the present invention as incorporating a touch-sensitive slide-lock control. However, other embodiments utilize a control disposed on the housing of the device 10. For example, the control may be a button, a knob, or other user control that a user must operate to unlock the device. In these cases, the functions of these controls are re-mapped and used to directly launch a specific, predetermined application as previously stated.

Additionally, the orientation sensor 16 as described in the previous embodiments comprises an accelerometer. However, this is for illustrative purposes only. The present invention is not limited only to the use of an accelerometer as an orientation sensor 16. In other embodiments, camera 18 is used as an orientation sensor. For example, unlocking device 10 could automatically trigger the controller 12 to generate a control signal to cause camera 18 to capture an image. The controller 12 could then be programmed to perform known image processing techniques on the image to determine the current orientation of the device. Based on the determined orientation of device 10, the controller 12 could then directly launch a specific, predetermined application, as previously described.

In another embodiment, the controller 12 is configured to detect a placement of the user's hands and/or fingers on the surface of device 10 and/or touch sensitive display 30, for example, when the user actuates the control to unlock device 10. Once unlocked, the controller 12 would determine the orientation of device 10 based on known techniques and launch a specific, predetermined application based on that orientation as previously described.

Further, although the specification describes different application programs being launched based on the detected orientation of the device 10, those skilled in the art should appreciate that the present invention may also be used to launch a single application program in one of a plurality of modes. For example, unlocking device 10 while in a first horizontal orientation (e.g., FIG. 2B) could cause controller 12 to launch an application program in a first operating mode, while unlocking device 10 in a second horizontal orientation (e.g., FIG. 2C) could cause controller 12 to launch the same application program, but in a second operating mode. Thus, responsive to the detected orientation of device 10 when it is unlocked, the present invention may be utilized to directly launch different applications based on the detected orientation, or different operating modes of the same application.

Therefore, the present embodiments are to be considered in all respects as illustrative and not restrictive, and all changes coming within the meaning and equivalency range of the appended claims are intended to be embraced therein.

What is claimed is:

1. A method of launching application programs on a consumer electronic device, the method comprising:
    storing a plurality of application programs in a memory of the consumer electronics device;
    determining a current orientation of the consumer electronics device;
    displaying a graphical indicator on a slide-lock control displayed on the consumer electronic device to identify which selected application program would be executed responsive to transitioning the consumer electronic device from a locked state to an unlocked state in the current orientation;
    changing the graphical indicator from a first graphical indicator identifying a first selected application program to a second graphical indicator identifying a second selected application program responsive to detecting a change in the current orientation of the consumer electronic device;
    receiving input transitioning the consumer electronic device from the locked state to the unlocked state;
    responsive to detecting the consumer electronics device transitioning from the locked state to the unlocked state, executing an application program selected based on the current orientation of the consumer electronics device responsive to the device transitioning from a locked state to an unlocked state.

2. The method of claim 1 further comprising receiving an orientation signal from an orientation sensor associated with the consumer electronic device indicating the current orientation of the consumer electronic device.

3. The method of claim 1 further comprising receiving user input transitioning the consumer electronic device from the locked state to the unlocked state.

4. The method of claim 3 wherein receiving user input transitioning the consumer electronic device to the unlocked state comprises detecting that the user has actuated the slide-lock control on the consumer electronic device.

5. The method of claim 1 further comprising:
    associating respective identifiers for one or more of the application programs to corresponding orientation indicators for the consumer electronic device; and
    storing the associations in memory of the consumer electronic device.

6. The method of claim 5 wherein executing the selected application program comprises:
    placing the consumer electronic device into the unlocked state;
    comparing the current orientation of the device to the orientation indicators stored in memory; and
    executing the application program corresponding to the orientation indicator that matches the determined current orientation of the device.

7. A consumer electronics device comprising:
    a memory circuit configured to store a plurality of application programs to be executed by the consumer electronic device;
    a touch-sensitive display configured to display a slide-lock control that outputs an unlock signal responsive to a user transitioning the consumer electronic device from a locked state to an unlocked state;
    a programmable controller circuit configured to:
        determine a current orientation of the consumer electronics device;
        receive input transitioning the consumer electronic device from the locked state to the unlocked state;
        responsive to detecting the consumer electronics device transitioning from the locked state to the unlocked state, execute an application program selected based on the current orientation of the consumer electronic device when the device transitions from a locked state to an unlocked state;
    wherein the slide-lock control includes a graphical indicator that identifies which selected application program would be executed responsive to the user transitioning the consumer electronic device to the unlocked state in the current orientation; and
    wherein the programmable controller circuit is configured to change the graphical indicator from a first indicator to a second indicator responsive to detecting a change in the orientation of the consumer electronic device.

8. The device of claim 7 further comprising an orientation sensor configured to provide an orientation signal identifying the orientation of the device.

9. The device of claim 8 wherein the orientation sensor comprises an accelerometer.

10. The device of claim 9 further comprising a user interface, and wherein the programmable controller circuit is configured to receive user input from the user interface transitioning the consumer electronic device to the unlocked state.

11. The device of claim 10 wherein the programmable controller circuit is configured to:
    associate respective identifiers for one or more of the application programs to corresponding orientation indicators for the consumer electronic device; and
    store the associations in the memory.

12. The device of claim 11 wherein the programmable controller circuit is further configured to:
    place the consumer electronic device into the unlocked state;
    compare the current orientation of the device to the orientation indicators stored in the memory circuit; and
    execute the application program corresponding to the orientation indicator that matches the current orientation of the device.

13. A consumer electronic device comprising:
    a memory circuit configured to store a plurality of application programs to be executed by the consumer electronic device;
    a touch-sensitive slide-lock control configured to transition the consumer electronics device from a locked state to an unlocked state, wherein the slide-lock control includes a graphical indicator that identifies which selected application program would be executed responsive to the user transitioning the consumer electronic device to the unlocked state;

an orientation sensor configured to output orientation signals indicating a current orientation of the consumer electronic device; and a programmable controller circuit configured to:
 determine the current orientation of the consumer electronics device based on the orientation signals output by the orientation sensor;
 change the graphical indicator from a first indicator to a second indicator responsive to detecting a change in the current orientation of the consumer electronic device;
 receive user input at the touch-sensitive slide-lock control transitioning the consumer electronic device from the locked state to the unlocked state; and
 responsive to detecting the consumer electronics device transitioning from the locked state to the unlocked state, execute a selected application program stored in the memory circuit based on the orientation signals.

* * * * *